United States Patent
Westphal

(10) Patent No.: US 8,027,259 B2
(45) Date of Patent: Sep. 27, 2011

(54) OPPORTUNISTIC ROUTING PROTOCOL IN AD HOC NETWORKS

(75) Inventor: Cedric Westphal, San Francisco, CA (US)

(73) Assignee: Nokia Corporation (FI)

( * ) Notice: Subject to any disclaimer, the term of this patent is extended or adjusted under 35 U.S.C. 154(b) by 1141 days.

(21) Appl. No.: 11/479,548

(22) Filed: Jun. 30, 2006

(65) Prior Publication Data

US 2008/0002640 A1    Jan. 3, 2008

(51) Int. Cl.
*H04L 12/28*    (2006.01)
*H04W 40/00*    (2009.01)

(52) U.S. Cl. ........ 370/238; 370/237; 370/338; 370/351; 370/395.31; 455/428; 455/445

(58) Field of Classification Search .......... 370/237–238, 370/338, 351, 395.31; 455/428, 445
See application file for complete search history.

(56) References Cited

U.S. PATENT DOCUMENTS

| | | | |
|---|---|---|---|
| 2002/0137459 A1* | 9/2002 | Ebata et al. | 455/16 |
| 2004/0008691 A1* | 1/2004 | Winter et al. | 370/395.31 |
| 2004/0143842 A1* | 7/2004 | Joshi | 725/32 |
| 2005/0249186 A1* | 11/2005 | Kelsey et al. | 370/349 |
| 2006/0067232 A1* | 3/2006 | Lee et al. | 370/235 |
| 2007/0274268 A1* | 11/2007 | Axelsson et al. | 370/338 |

OTHER PUBLICATIONS

Biswas and Morris, ExOR: Opportunistic multi-hop routing for wireless networks. In SIGCOMM '05: Proceedings of the 2005 conference on Applications, technologies, architectures, and protocols for computer communications, vol. 35, No. 4. New Yor, NY: ACM Press, Oct. 2005, p. 133-144.
Perkins et al., Network working group; Request for comments: 3561; Category: Experimental; Ad-hoc on-demand distance vector (AODV) Routhing. Jul. 2003, p. 1-37.
Perkins and Royer, Ad-hoc on-demand distance vector routing. Mobile computing systems and applications, 1999. Proceedings. WMCSA 1999. Second IEEE Workshop, p. 90-100, Feb. 1999.
International Search report for PCT Application No. PCT/IB2007/052361.
Opportunistic Routing in Dynamic Ad Hoc Networks: the OPRAH protocol, Nokia Technical Report, Jul. 2005, pp. 1-10.

* cited by examiner

*Primary Examiner* — Dwayne Bost
*Assistant Examiner* — Michael Mapa
(74) *Attorney, Agent, or Firm* — Banner & Witcoff, Ltd.

(57) ABSTRACT

An opportunistic ad hoc routing protocol system and method includes a dynamic ad hoc network having one or more nodes configured to communicate wirelessly with each other. Each node is configured to implement a routing protocol wherein a list of possible relay nodes is stored in each of the one or more nodes' routing tables. In addition, each node is configured to implement a protocol adapted to allow different nodes to receive the same packet. Further, each node is adapted to update the list of possible relay nodes in order to capture a change in the ad hoc network.

19 Claims, 14 Drawing Sheets

OPPORTUNISTIC ROUTING PROTOCOL IN AD HOC NETWORKS

FIELD OF INVENTION

The present invention relates to wireless network technology. Specifically, the present invention relates to an opportunistic routing protocol in an ad hoc network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An ad hoc network may be defined as a kind of wireless network where stations or devices communicate directly with other stations or devices and not via an access point. Ad hoc networks are commonly used to establish a network where network infrastructure does not exist.

The promiscuous nature of a wireless network or "the air interface" has been typically considered a hindrance to transmission. Overhearing the other participants' traffic in a wireless communication network is assumed to be interference, which is commonly sought to be remedied. Only recently has it been considered to use the fundamental broadcast characteristic of the air interface to the advantage of a communication network.

Ad hoc networks, where wireless nodes are within range of each other and use each other to relay messages where leveraging the broadcast nature of the air interface, may be beneficial. However, typical ad hoc routing protocols are generally directed to discovering one good route for the life of a connection rather than making use of a diversity of transmission paths available at any instant.

The conditions in an ad hoc network consistently evolve. Discovering a good transmission route is a difficult task in a highly dynamic system. For example, fading alters the condition of each wireless link, making some nodes disappear at a moment's notice, only to reappear soon after. Mobility of the nodes also perturbs the connectivity between node pairs. Accordingly, a good route often ends up being a route that lasts for a desired period of time, no matter how sub-optimal the connection is at any given time.

Some known systems take advantage of the broadcast nature of the air interface. For example, cellular networks schedule packets from a base station to mobile terminals by considering some channel quality indicator (CQI), so that at every time slot, the best channel, with respect to some metric, is chosen. However, this architecture is too specific to cellular architectures to be applied in ad hoc networks.

Notwithstanding the above, opportunistic protocols are beneficial for several reasons. For example, it is helpful to consider the simple case of a square area. To establish a connection between two nodes that sit at some diagonally opposite corners, which are denoted s and d, the nodes are connected via relays, which are uniformly distributed in the square. The connectivity between each node pair is affected by some fading. There are two broad types of routing protocols which are referred to as reactive and proactive. A proactive protocol will try to identify the connectivity between the nodes ahead of time and store the information in a route table. A reactive protocol attempts to identify the route only at the time of the connection establishment.

In a system having static nodes where a single connection is to be established, both proactive and reactive protocols behave similarly. The protocols attempt to identify a route that will last the length of the connection. If the route evolves during the time of the connection, both types of protocols react differently.

In a static environment, where connectivity is perturbed only by fading between two fixed points, the performance of these protocols depends on how robust a route is. Experimental results by implementing and deploying an ad hoc network have shown that most protocols perform poorly. For instance, Douglas S. J. De Couto, Daniel Aguayo, John Bicket, Robert Morris, *A High-Throughput Path Metric for Multi-Hop Wireless Routing*, Proceedings of the 9th ACM International Conference on Mobile Computing and Networking (MobiCom '03), San Diego, Calif., September 2003 (incorporated herein by reference), shows that existing ad hoc protocols do not perform well where connectivity is perturbed only by fading between two fixed points.

FIG. 1 illustrates the results of a simulation for an ad hoc network using a known routing protocol with a correlated Rayleigh fading. Correlated Gaussian processes were used to generate a correlated fading distribution, which were then used to establish the connectivity between nodes in the square. The connectivity was assumed constant over each time slot. This means that the coherence time of the channel is larger than one time slot. As most ad hoc protocols attempt to take the path with the shortest number of hops, the shortest path length in each time slot is plotted in FIG. 1. For the simulation, a 500 m×500 m square was considered, occupied by a number of nodes varying from 50 to a 100 nodes. The distance at which two nodes can connect was also variable, and depended on the model. The maximum connection distance was set to about 300 m.

The same scenario was simulated for channels described by a Gilbert-Elliot model, as discussed in E. Gilbert, *Capacity of a burst-noise channel*, Bell System Technical Journal, pp. 1253-65, 1960 (incorporated herein by reference). The Gilbert-Elliot (GE) model is a typical model for simulating a channel with some correlated packet errors. The parameters for the GE model were obtained from Ben Miler, Alastair James, *An Analysis of Packet Loss Models for Distributed Speech Recognition* in Proc. ICSLP 2004, October 2004 (incorporated herein by reference). Miler gives parameters for three types of channel, each separated by 3 dB. A free space attenuation of the signal was considered to map these types of channel to a distance in the graph of FIG. 1, so that a doubling of the distance corresponds to a 6 dB drop in power. For nodes outside the last range, it was assumed that there was no connectivity. Extending the connectivity range to include these nodes would only increase the variability in the shortest path length. The resulting simulations are plotted as shown in FIG. 2.

It should be noted that interference was not considered in either the GE or the Rayleigh model. Interference would only increase the number of hops as each link would get a higher chance of dropping the packet. This too would increase the variability in the shortest path length. In both cases, it can be seen that the shortest path is subject to some significant variations, even though it is a static network. Most current ad hoc protocols settle on a single route, the shortest path at the time of establishment for a reactive protocol, or the shortest path at the time of compilation of the route table, for a proactive one. Both prove harmful to the performance of the system because either the protocol settles for a shortest path that is not sustainable, or it settles for a path that is under-performing every time there exists a shorter path.

Current ad hoc network systems have not fully harnessed the advantages of opportunistic routing. Opportunistic scheduling has been extensively used in one-to-many transmissions, mostly in scheduling nodes with respect to the conditions of the channel which connects them to a base station. However, in the ad hoc context, there are relevant works to consider which take advantage of the diversity offered by multiple users over the air interface.

The most relevant work on the topic is Sanjit Biswas, Robert Morris, *Opportunistic Routing in Multi-Hop Wireless Networks*, Proceedings of the Second Workshop on Hot Topics in Networking (HotNets-II), Cambridge, Mass., November 2003 (incorporated herein by reference). This work by Biswas and Morris arose from a practical problem. The Roof-Net project (as discussed at http://www.pdos.lcs.mit.edu/roofnet/, incorporated herein by reference) was first deployed using traditional and standardized Media Access Control (MAC) layers and network and routing protocols. However, these protocols turned out to perform somewhat poorly, as discussed in Douglas S. J. De Couto, Daniel Aguayo, John Bicket, Robert Morris, *A High-Throughput Path Metric for Multi-Hop Wireless Routing*, Proceedings of the 9th ACM International Conference on Mobile Computing and Networking (MobiCom '03), San Diego, Calif., September 2003 (incorporated herein by reference).

To improve the overall performance of the network, the first intuition in Douglas was to change the performance metrics because typical routing protocols choose route based on minimizing a metric, hop count, which leads to under-performing routes. Douglas explored how minimizing the number of retransmission instead of the number of hops would improve the performance.

In a parallel effort, others in the RoofNet group considered opportunistic routing. The idea is to use diversity from one sender to multiple receiver. To achieve this, they modified two key elements: the routing and the MAC protocol. The routing protocol is modified so that there is not one single candidate for the next hop, but rather a list of possible candidates: all the nodes that would forward the packet closer to the destination (in the network topology sense) are included in the routing table.

The MAC is adapted to allow for different receivers to receive the same packet. Thus, the list of intended receivers for the next hop is included in the MAC header. The intended receivers acknowledge in turn, so that the sender knows that at least one receiver has received the packet successfully. All receivers are also assumed to overhear the acknowledgement to decide whether or not to forward their copy of the packet. Unfortunately, the protocol discussed in Biswas was not configured to operate in a dynamic ad hoc network.

FIG. 4 illustrates how the forwarding candidates are ordered in Biswas. Candidate A is a preferred relay over B, and B over C. The acknowledgement is returned to the sender with the most preferred candidate.

Other related work includes GPSR, as discussed in Brad Karp, H. T. Kung, *GPSR: Greedy Perimeter Stateless Routing for Wireless Networks* in Proc. of the 6th Annual ACM/IEEE International Conference on Mobile Computing and Networking (MobiCom 2000) (incorporated herein by reference). GPSR is a geographic routing protocol, so it is tangentially related to opportunistic routing. The idea behind GPSR is to forward the packet to the node within range which will then advance the packet the closest to its destination. The advantage to this method, is that there is no scalability issue in the routing table, because determining which node is the next hop is a purely geometric calculation. GPSR, forwarding switches to a perimeter mode when there is no node which is closer to the destination than the current node.

The system described by Brian Blum, Tian He, Sang Son, and John Stankovic. *IGF: A state-free robust communication protocol for wireless sensor networks*. Technical report CS-2003-11, University of Virginia CS Department, 2003 (incorporated herein by reference), is similar to Biswas in the way that the MAC layer is adapted. node sends a request to a group of potential relays, and the responses to the request are staggered so as to avoid collision. Further, the group of potential relays are composed of nodes which overhear each other, so that an acknowledgement by one of the nodes of the request, is heard by the other nodes. As such, only one node replies, namely the first one to do so. The Blum system differs from Biswas in that the list of potential relays is not given by the sender in the MAC header, but is defined based on the position of the nodes within a geographical area. The area can be mapped using GPS information for position, or some localization algorithm. However, one disadvantage of geographic routing is it requires positioning information and geographic addressing.

Accordingly, there is a need for a routing protocol which adapts itself opportunistically to the channel conditions in a dynamic ad hoc network.

SUMMARY OF THE INVENTION

According to one embodiment of the invention, an opportunistic ad hoc routing protocol system includes a dynamic ad hoc network having one or more nodes configured to communicate wirelessly with each other. Each node is configured to implement a routing protocol wherein a list of possible relay nodes is stored in each of the one or more nodes' routing tables. In addition, each node is configured to implement a protocol adapted to allow different nodes to receive the same packet. Further, each node is adapted to update the list of possible relay nodes in order to capture a change in the ad hoc network.

According to another embodiment of the invention a method for implementing opportunistic routing in an ad-hoc network, comprises first sending a broadcast message, comprising one or more packets, from a source node to a destination node. The broadcast message is received at one or more relay nodes. Each relay node updates a received packet, creates a route entry in a route table of the relay node and rebroadcasts the updated packet to one or more neighboring relay nodes. An additional broadcast message may be received at the one or more relay nodes from a forwarding node. A hop count of the additional broadcast message is compared with one or more hop count values stored in the route table. If the hop count of the additional broadcast is less than a threshold value, an additional entry is created in the route table for the forwarding node. The broadcast message is then received at a destination node. The destination node updates the received packet, creates a route entry in a route table of the destination node and sends a route reply message to the source node. Next, the route reply message is received at the one or more relay nodes. Accordingly, the one or more relay nodes update their route tables to identify new potential forwarding nodes. The one or more relay nodes send an acknowledgment to the destination node that the route reply message was received by the one or more relay nodes and the route reply message is forwarded to the source node.

According to yet another embodiment of the invention, if the MAC address of the one or more relay nodes is included in the MAC header of the route reply message a method for implementing opportunistic routing in an ad-hoc network includes receiving the route reply wherein a hop count to the destination node of the one or more relay nodes is incremented by one. Next, a value equal to the minimum number of hops to the source node is inserted in a header of a received packet. An entry is added to the route table of the one or more relay nodes identifying a potential forwarding node to the destination node.

According to yet another embodiment of the invention, if the one or more relay nodes receives the route reply message via a local broadcast address a method for implementing opportunistic routing in an ad-hoc network includes receiving the route reply wherein the method determines whether the one or more relay nodes is a candidate for node forwarding. If the one or more relay nodes is a candidate for node forwarding, a received packet and the route table of the one or more relay nodes is updated. In addition, an acknowledgment is sent to the forwarding node.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 5:
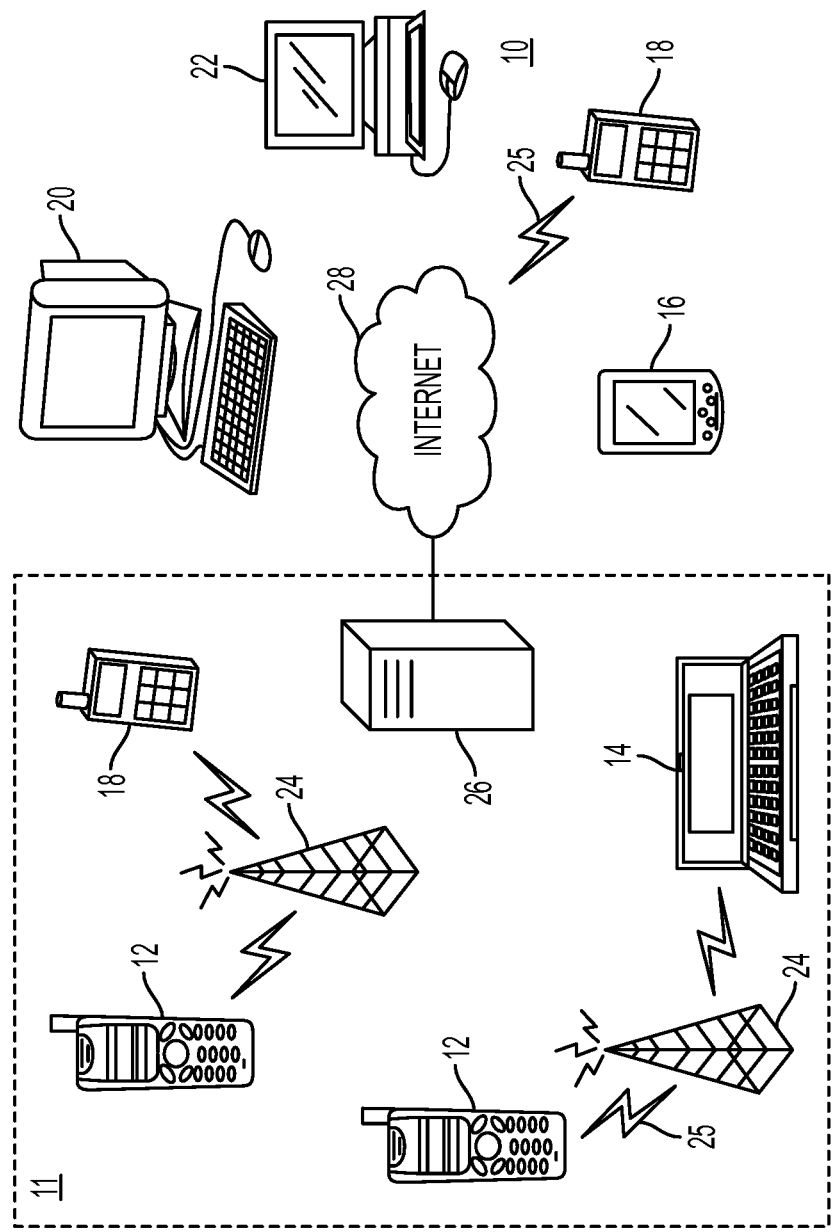
FIG. 5 is an overview diagram of a system within which the present invention may be implemented.

FIG. 5 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

Figure 1:
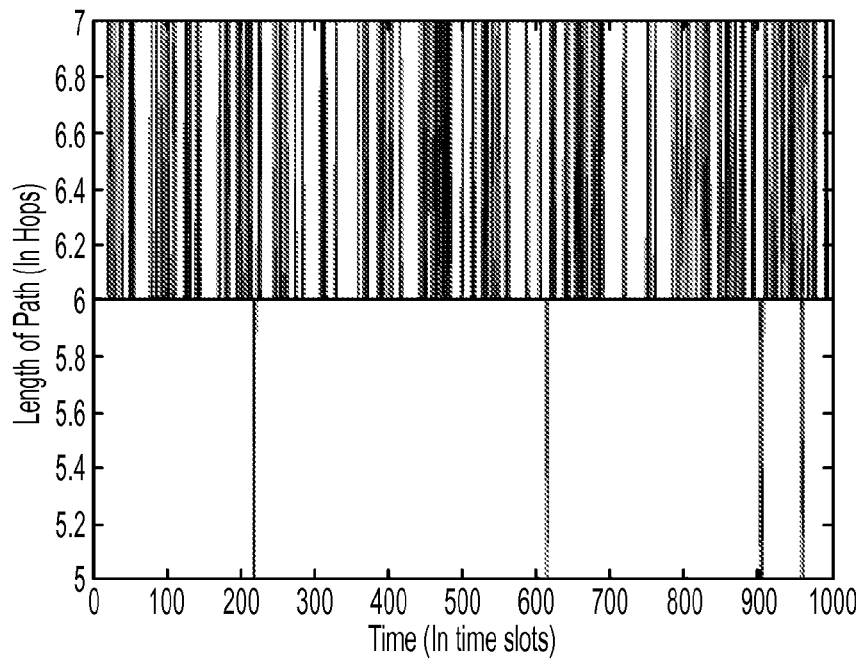
FIG. 1 is a graph of the shortest path in number of hops as a function of time in a Rayleigh fading simulation.
Figure 2:
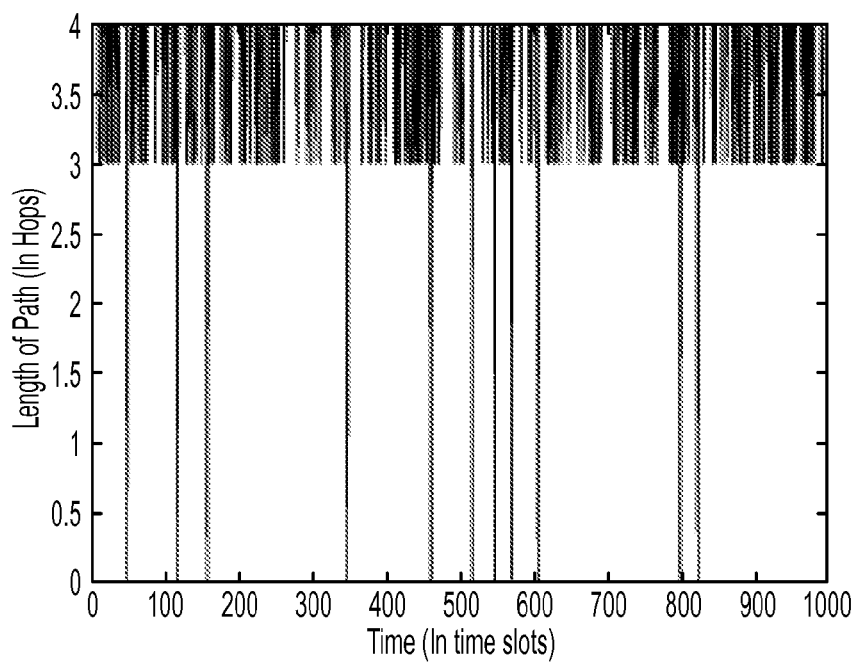
FIG. 2 is graph of the shortest path in number of hops as a function of time in a Gilbert-Elliot model.
Figure 3:
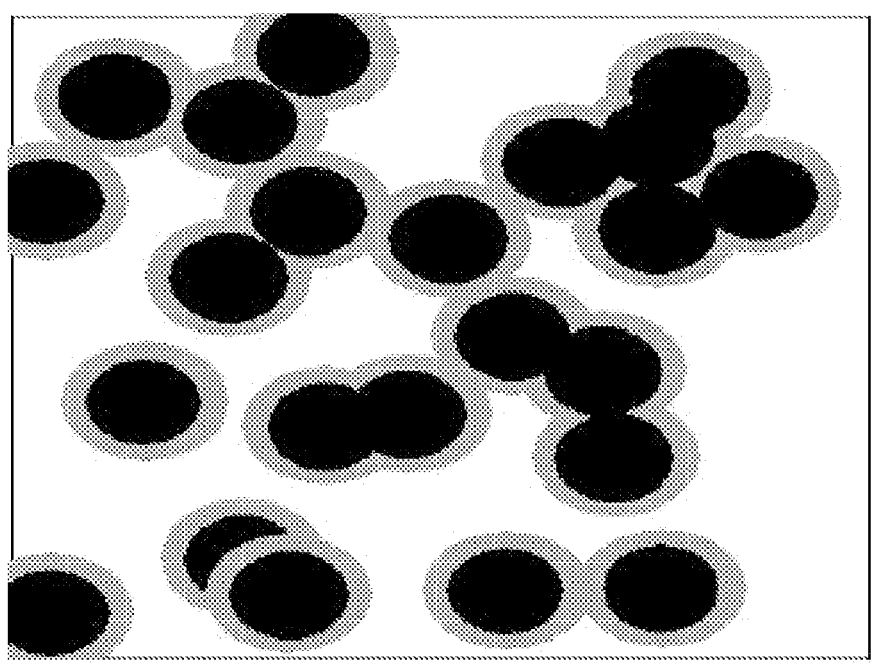
FIG. 3 is a diagram illustrating how opportunistic routing increases connectivity in a wireless network.
Figure 4:
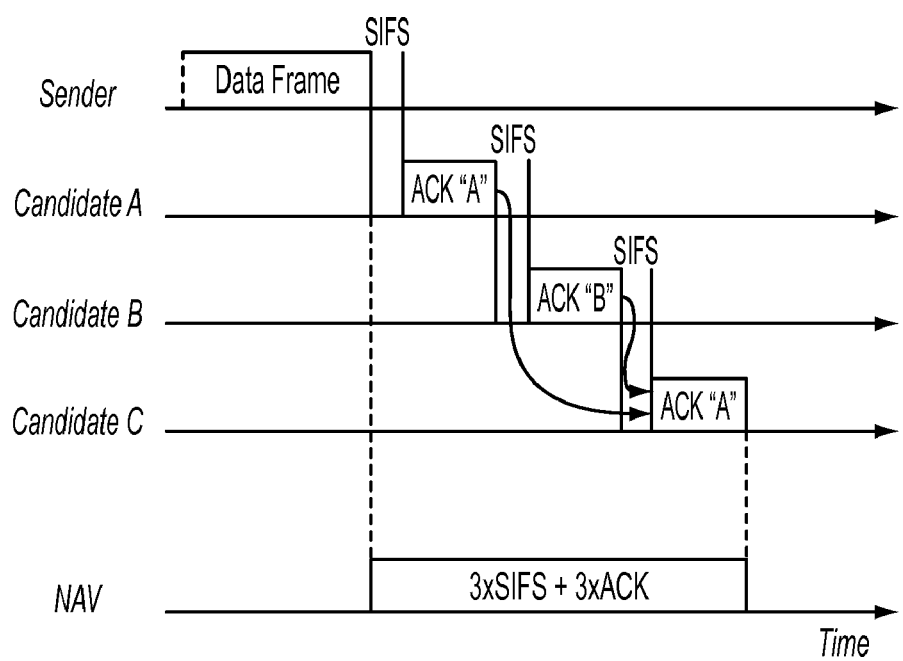
FIG. 4 is a diagram illustrating an opportunistic MAC protocol.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 6:
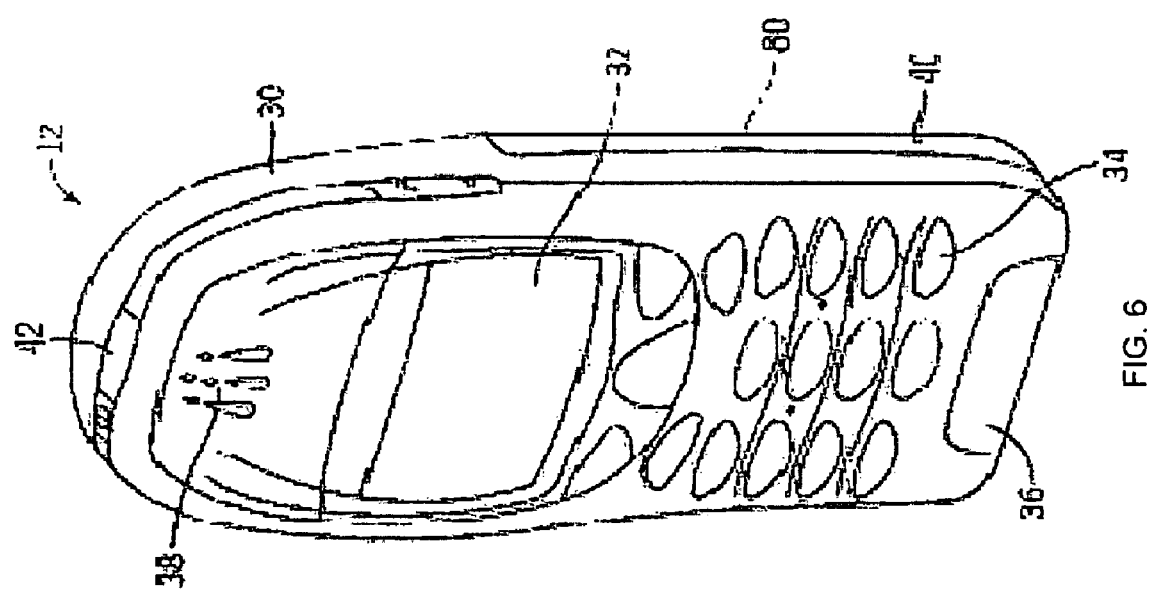
FIG. 6 is a perspective view of a mobile telephone that can be used in the implementation of the present invention.
Figure 7:
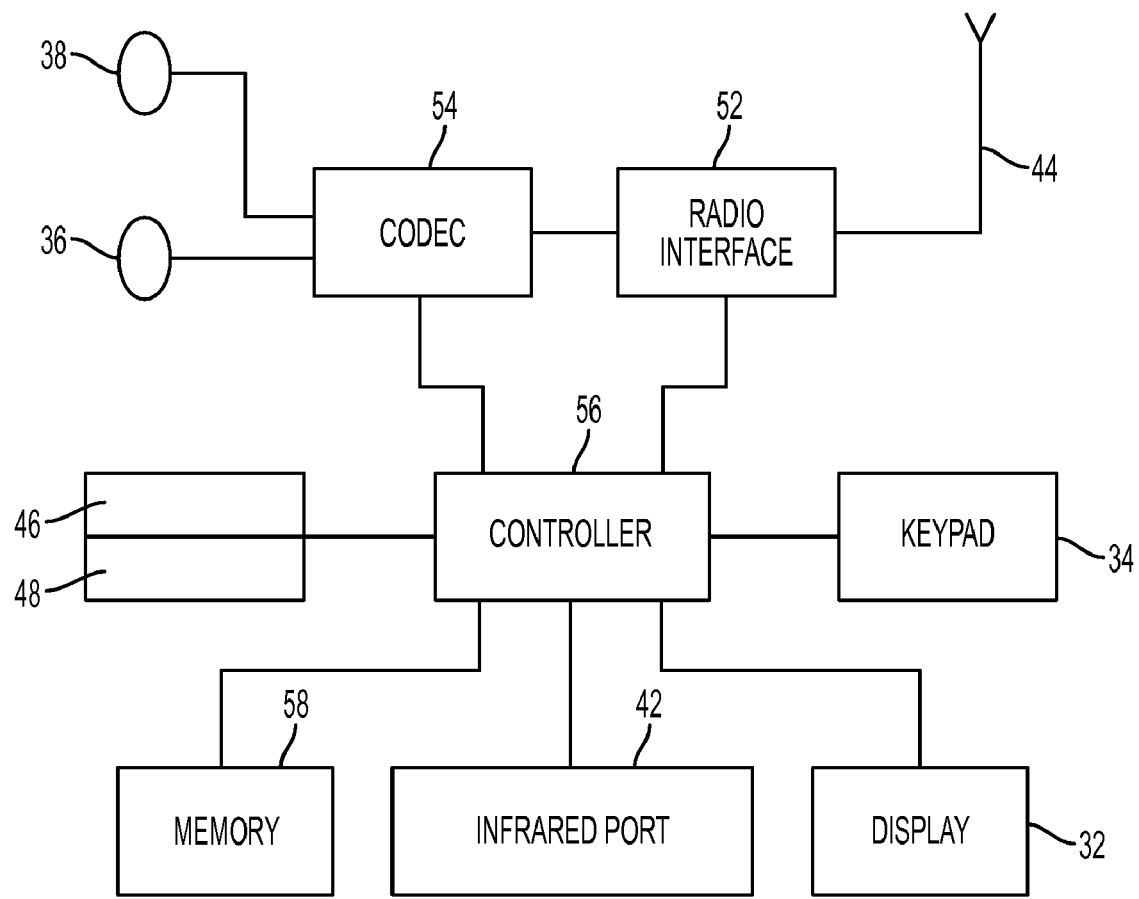
FIG. 7 is a schematic representation of the telephone circuitry of the mobile telephone of FIG. 6.

FIGS. 6 and 7 show one representative mobile telephone 12 within which the present invention may be implemented. It should be understood, however, that the present invention is not intended to be limited to one particular type of mobile telephone 12 or other electronic device. The mobile telephone 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 8:
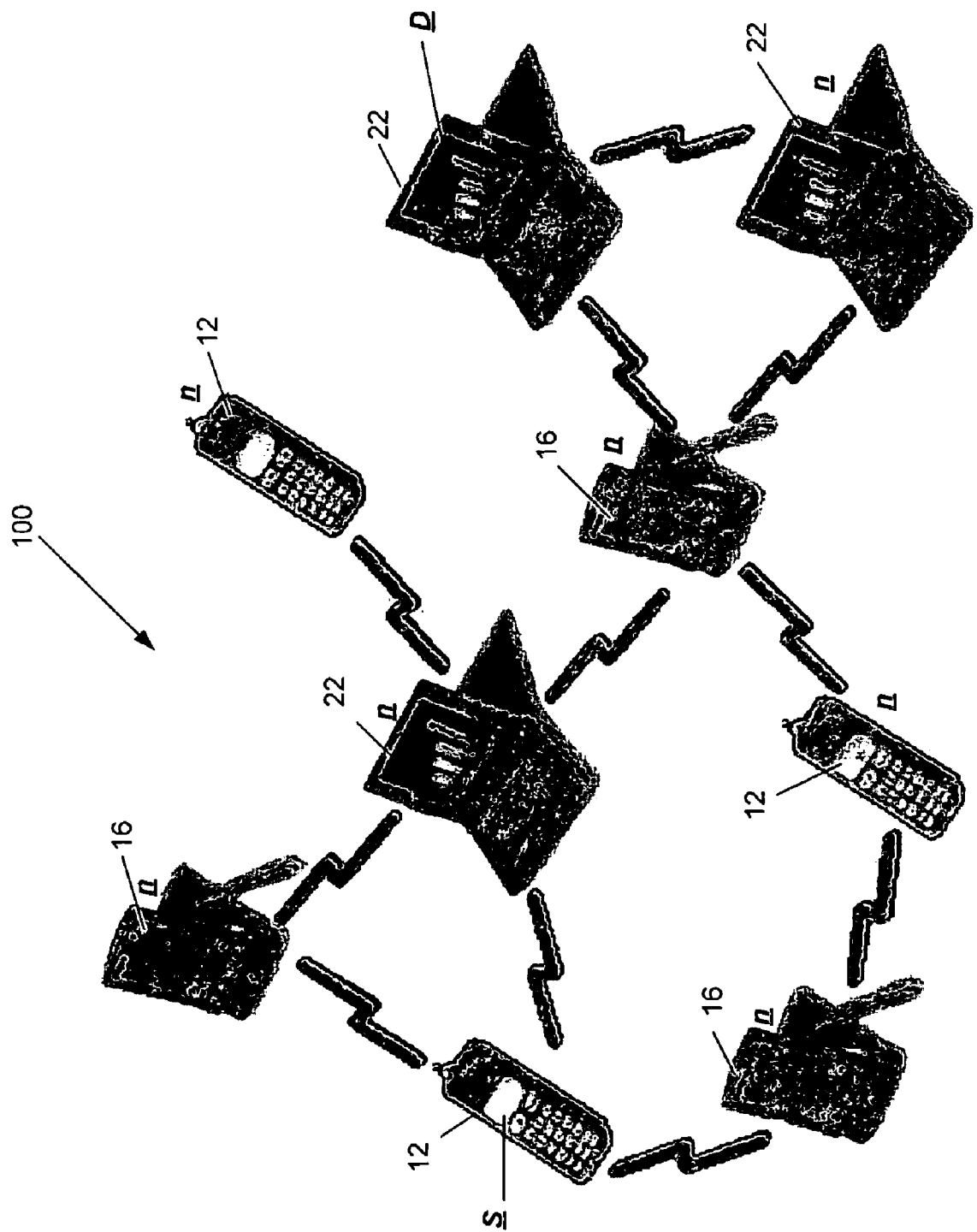
FIG. 8 is an ad hoc network according to one embodiment of the invention.
Figure 9A:
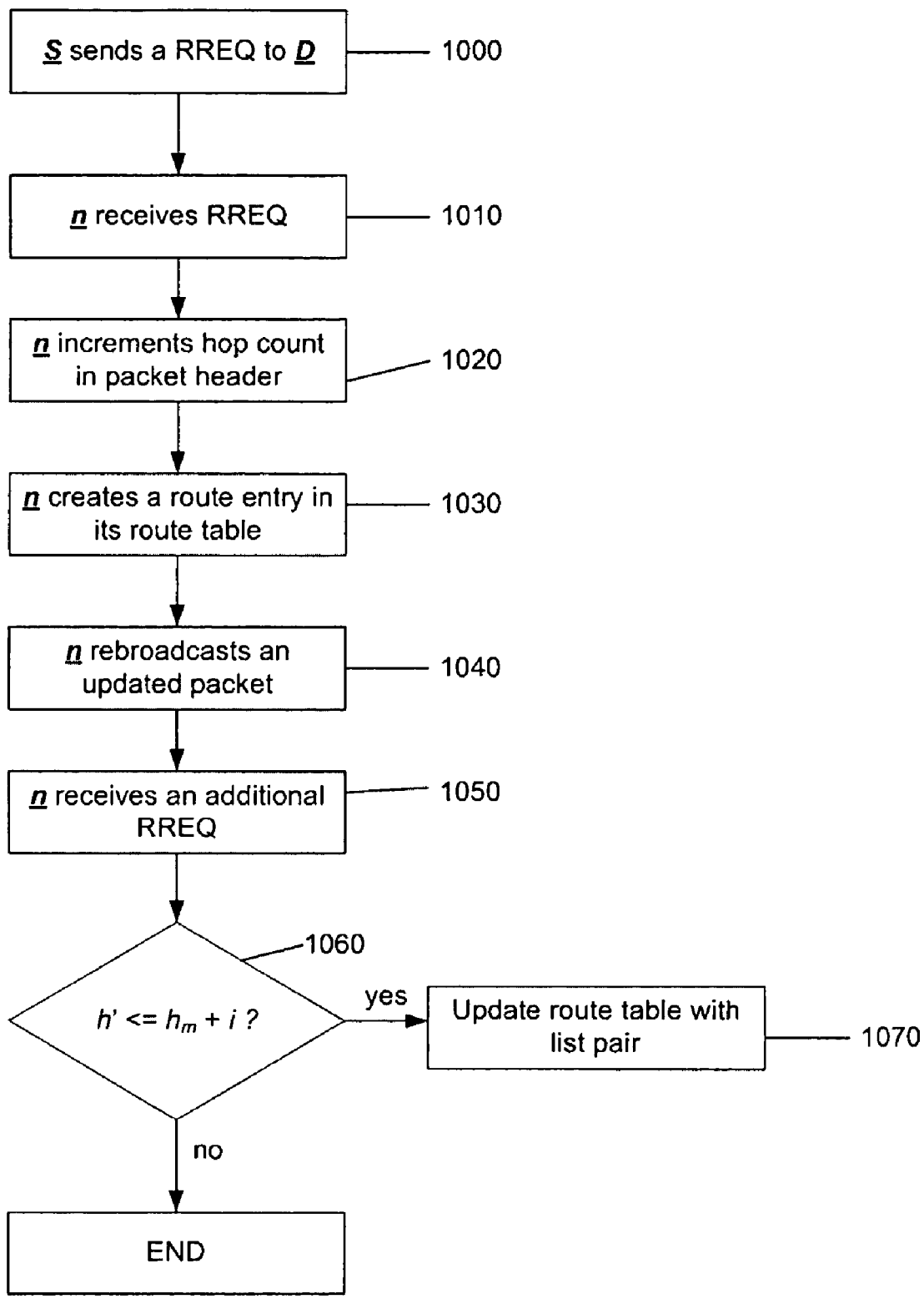
FIG. 9(a) is a flowchart illustrating the receipt of a routing request broadcast message according to one embodiment of the present invention.
Figure 9B:
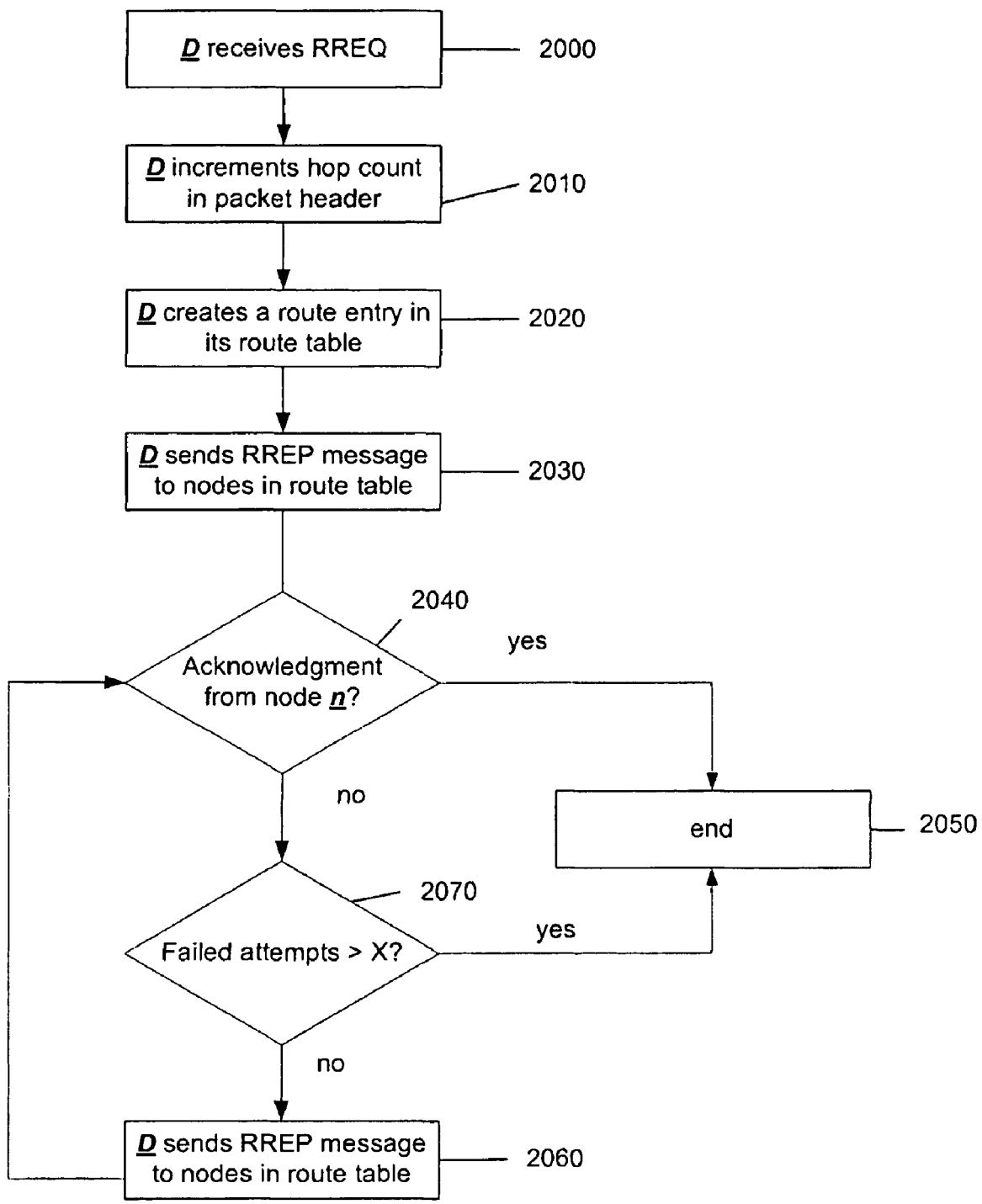
FIG. 9(b) is a flowchart illustrating the receipt of a routing request broadcast message according to another embodiment of the present invention.
Figure 9C:
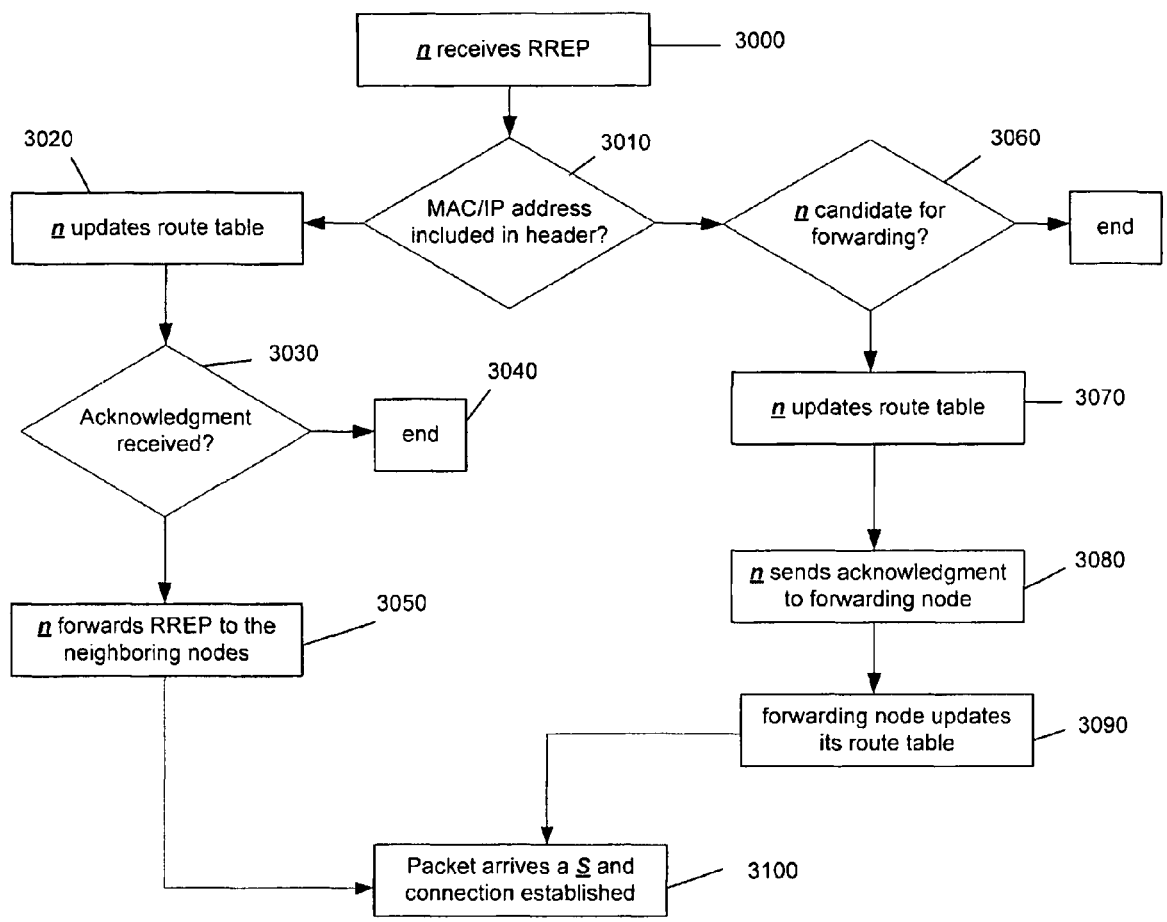
FIG. 9(c) is a flowchart illustrating the receipt of a route reply broadcast message according to one embodiment of the invention.
Figure 9D:
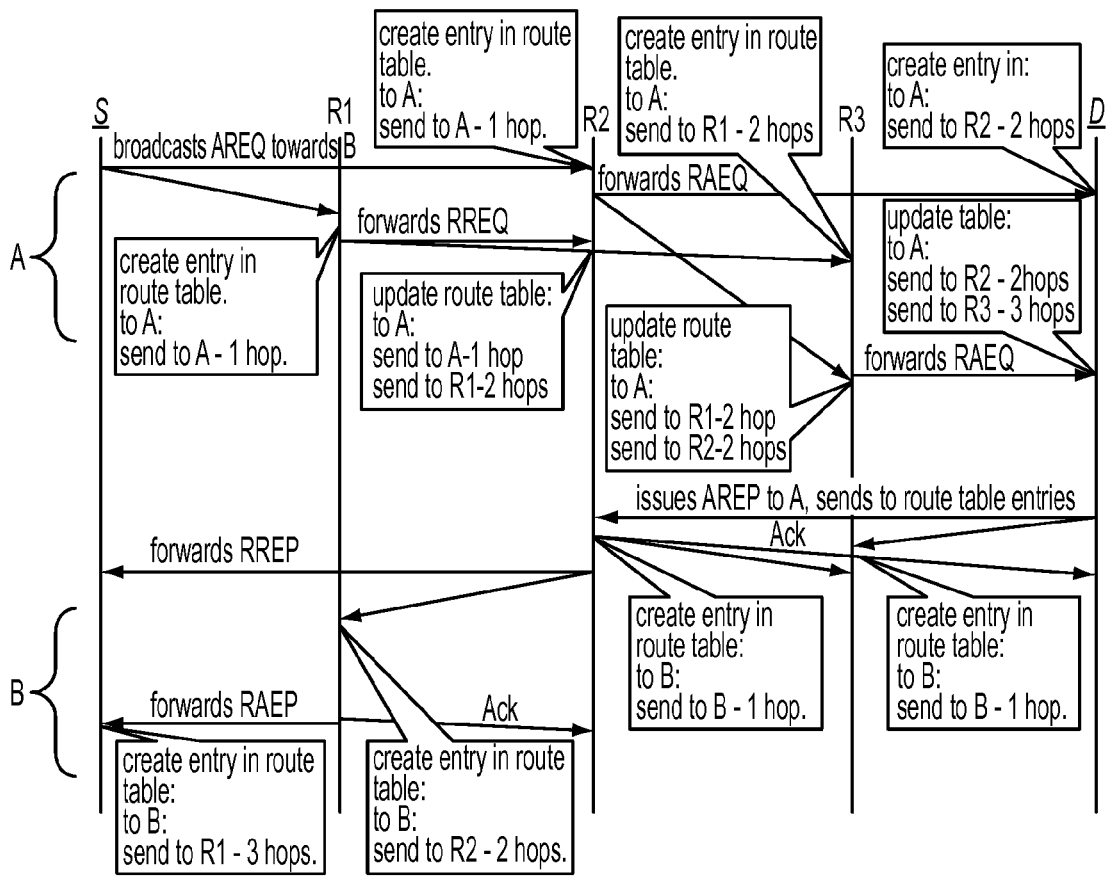
FIG. 9(d) is a diagram showing the establishment of route entries for an opportunistic routing protocol according to one embodiment of the invention.

FIG. 8 shows an ad hoc network 100 according to one embodiment of the invention. As shown, a plurality of nodes n are configured to communicate wirelessly with each of the other nodes n present on the ad hoc network 100. A node can be one of several devices configured for wireless communication including but not limited to a PDA 16, mobile phone 12, and notebook computer 22. According to one embodiment of the invention, the ad hoc network 100 is based on the 802.11 framework. Thus, each of the plurality of nodes n is IP enabled and listens to the same channel for reception and transmission of data. The 802.11 framework allows the nodes n to communicate with other nodes n while in a dynamic environment. Accordingly, the nodes n do not have to agree on a dedicated channel for communication. Each node n in the ad hoc network 100 is capable of relaying data traffic for the other nodes n. Generally, the nodes n have no knowledge of their relative geographical positions.

According to one embodiment of the invention, the routing protocol of the ad hoc network 100 is modified so that there is not one single candidate for the next hop, but rather a list of possible candidates. Thus for a given node n all the nodes that would forward the packet closer to the destination are included in the node's n routing table. Further, the MAC protocol of the ad hoc network 100 is adapted to allow for different nodes n to receive the same packet. Thus, the list of intended receivers for the next hop is included in the MAC header. The intended receivers acknowledge in turn, so that the sender knows that at least one receiver has received the packet successfully. All receiving nodes n are also assumed to overhear the acknowledgement to decide whether or not to forward their copy of the packet. In addition, as will be described below, each node n is capable of updating itself in the event of a change in the ad hoc network. A change, for example, could be the addition or subtraction from the network 100 of a node n.

For description purposes, a mobile phone 12 is labeled S in order to represent a source node and a notebook computer 22 is labeled D in order to represent a destination node. Accordingly, the remaining nodes are labeled n to denote that for the purposes of this discussion those nodes are relay nodes. According to one embodiment of the invention and as shown in FIGS. 9(*a*)-9(*d*), when the source node S wishes to establish a connection to a destination node D, node S sends a broadcast message to node D. (Step 1000). The broadcast message is a flooded broadcast so that a packet is sent to every node n present in the ad-hoc network 100. The packet is a segment of information that maintains its integrity as it travels across a network. Each packet contains a header containing information that includes the type of traffic it is and identifies its source, which in this case is node S. The format of the broadcast is that of a route request RREQ, similar to an AODV route request. AODV is a reactive routing protocol and establishes a route to a destination only on demand. The broadcast message will hereinafter be referred to as a route request RREQ for the purpose of simplifying the discussion only. It should be understood that the broadcast message may be of a different type suitable for carrying out the purposes of the invention.

Each relay node n which receives the route request RREQ for the first time (Step 1010), carries out a set of tasks. First, according to one embodiment of the invention, a relay node n receiving the broadcast from the source node S increments the hop count stored in the packet header by one to create an updated packet (Step 1020). The hop count represents the number of legs traversed by a packet between the source node S and the destination node D. In addition, the relay node n creates a route entry in its route table (Step 1030). The route entry for a given relay node n is a list pair identifying the forwarding node $n_f$ (the node that forwarded the packet to the relay node n) and the packet header hop count ($n_f$, h). The relay node n then forwards the updated packet to other neighboring relay nodes n' by rebroadcasting the updated packet (Step 1040).

According to one embodiment of the invention, a relay node n might receive several copies of the route request RREQ because the source node S sends a flooded broadcast message (Step 1050). When the relay node n receives another copy of the broadcast message that was sent from the source node S to the destination node D from a neighboring node n' it compares the hop count h' in the packet header with the different hop count values stored in its route table (Step 1060). If the hop count h' in the packet header is less than or equal to a minimal value stored in the route table for the relay node n's route to the source node S plus a threshold i, then the relay node n updates its route table by adding a new list pair (n', h') to the route table entry to the source node S (Step 1070).

According to one embodiment of the invention, the threshold parameter i can be modified. For example, a possible threshold scenario would be to add a new list pair to the relay node n route table if the hop count of the additional broadcast is less or equal than the current hop count (found in the packet header)+1. In general, the value of the hop count in the packets of the duplicate broadcast messages will increase with time, so that the route table of the relay node n will accept new entries for only a short period of time and then will ignore additional broadcast messages. In addition, duplicate route requests are not rebroadcasted by the relay node n. Accordingly, the route request RREQ sent by the source node S establishes different paths back to the source S. A series of actions as described above is shown for example in FIG. 9(*d*) as segment A, where the ad hoc network 100 consists of a source node S a destination node D and relay nodes R1, R2 and R3.

Further, as shown in FIGS. 9(*b*) and 9(*d*), the destination node D processes the route request (RREQ) similarly to the relay nodes n described above (Steps 2000, 2010 and 2020), except that the destination node D does not forward the broadcast message (RREQ). Instead, the destination node D creates a route reply message RREP, and sends the RREP message to all the relay nodes n the destination node D has listed as potential forwarded entries in its route table (Step 2030). The route reply message RREP is addressed to D and includes two counters. The first RREP counter $h_d$, increases at every hop, and is used to assess the number of hops to route a packet from the relay node n which received the RREP back to the destination node D. The other RREP counter, $h_s$, stores the number of hops to the source node S.

According to one embodiment of the invention, the destination node D uses a standard forwarding process. Accordingly, the destination node D uses a MAC header with all the entries listed as forwarding nodes towards D in the route table, ordered by increasing hop count. A limited local broadcast address is appended at the end of the list.

After sending the route reply message RREP, the destination node D waits for an acknowledgement (Step 2040). In one particular embodiment, the waiting time is defined by the MAC protocol. If the destination node D receives an acknowledgment, then the process is complete (Step 2050). If the destination node D does not receive an acknowledgment, it retransmits the RREP message packet (Step 2060). After a predetermined number of failed transmission attempts, the packet is dropped completely (Step 2070).

As shown in FIGS. 9(*c*) and 9(*d*), {Segment B}, a relay node n which receives the route reply message RREP (Step 3000) from a neighboring node n' updates its route table. If the relay node n has its MAC address specifically included in the MAC header (Step 3010), it updates its route table (Step 3020) as follows: The relay node n increases the hop count h'$_D$ to the destination node D by one. In addition, the relay node n inserts a value representing the minimal number of hops toward the source node S in the header of the RREP packet. Further, the relay node n adds a list pair (n',h'$_D$) as an entry into its list of potential forwarding relay nodes n towards the destination node D.

The relay node n then awaits potential acknowledgements from neighboring relay nodes n' that are listed ahead of the relay node n on the MAC header list (Step 3030). If the relay node n receives an acknowledgement the relay node n does nothing (Step 3040). If the relay node n does not detect an acknowledgment then the relay node n forwards the route reply message RREP to the neighboring nodes n' in the relay node's n list of potential forwarding nodes toward the source node S using the same MAC format (Step 3050).

In the alternative, if the relay node n receives (overhears) the RREP packet by way of the limited local broadcast address, then first, the relay node n compares its entry in the route table for the source node S (Step 3060). If the value of a hop counter h'$_S$ included in the RREP packet is more than a minimal hop counter value h$_s$ stored in the relay nodes n's route table, then the relay node n is a good candidate node for forwarding. Accordingly, the relay node n increases its hop count and updates its route table (Step 3070). At this stage, the relay node n does not attempt to forward the RREP packet. Instead, the relay node n sends an acknowledgment signal to the node n' that forwarded the route reply RREP in the last acknowledgment time slot that the relay node n received the packet from the destination node D (Step 3080). Subsequently, the neighboring node n' updates its route table with the list pairs (n, h$_s$) (Step 3090). Once the packet (or the potential multiple packets) arrive back at the source node S, routing has been established in both directions. A connection is then established between the source node S and destination node D (Step 3100). In addition, the relay node n sends an acknowledgment to the destination node D.

According to one embodiment of the invention, packets are forwarded with rules similar as the rules for the route reply message RREP. Each packet being sent reinforces and potentially updates the information in the route tables of the relay nodes n, source node S and destination node D, as new nodes might be added by overhearing and responding to the limited local broadcast.

All entries in the route table of each of the nodes in the ad hoc network 100 are kept for the time of the connection only. The entries should be set in the table with a default TTL value of the order of a few round trip times. There is no need to keep the information longer in highly dynamic environment, and this ensures the scalability of the protocol. One advantage of the present invention is that the protocol can be made loop-free. The number of hops to the destination node D can be checked against the values in the header carried by the message packet.

Figure 10:
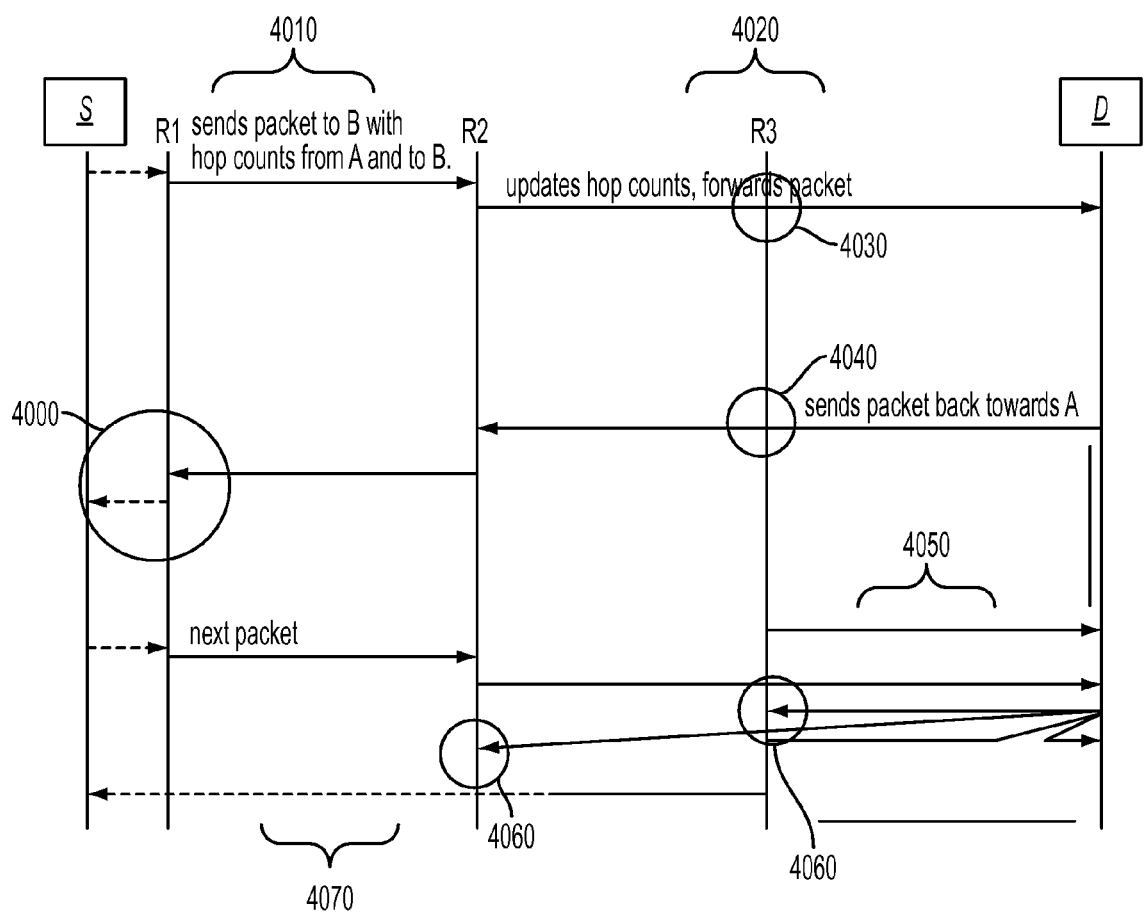
FIG. 10 is a diagram illustrating the update of route entries for an opportunistic routing protocol.

FIG. 10 illustrates a simple case to further describe the present invention. As shown, a source node S wishes to establish a connection to a destination node D, with relay nodes n denoted R1, R2, and R3 potentially available in between.

The forwarding of packets after the connection is established is done using the route tables as indicated. If some transmissions failed the first time around, then the route table is updated after the next successful transmission. For instance, in FIG. 10, the RREP message between the relay node R2 and the source node S is dropped, prompting the relay node R1 to send the RREP again (4000). If the next packet that the relay node R2 sends to the source node S goes through, then the source node S includes an entry to the relay node R2 towards the destination node D in its route table.

FIG. 10 further illustrates how route entries in a node route table are updated during a connection according to one embodiment of the invention. The relay node R1 sends a packet to the destination node D with hop counts from the source node S and to the destination node D in its route table (4010). As shown, the packet is sent from the relay node R1 to the relay node R2 and then to the destination node D, bypassing the relay node R3 (4010, 4020). The relay node R3 overhears the packet transmission from relay node R2 to destination node D (4030). According to one embodiment of the invention, the relay node R3 having no entry to the source node S in its route table, creates an entry in its route table. According to another embodiment of the invention, the relay node R3's hop count to the destination node D is lower than R2's hop count to the destination node D. Accordingly, the relay node R3 advertises to the relay node R2 so that the relay node R2 includes R3 in its route table.

According to another embodiment of the invention, the relay node R3's hop count to the Source node S is lower than the relay node R2's hop count to S. Accordingly, when a packet is sent back from the destination node D to the relay node R2, the relay node R3 overhears the packet transmission (4040). Because the hop count to the source node S is lower from the relay node R3 than it is from the relay node R2 the relay node R3 acknowledges the packet to the destination node D and transmits to the destination node D its hop counts to the source node S and the destination node D (4050). Subsequently, the destination node D includes the relay node R3 in its route table. Accordingly, upon receipt of another packet from the source node S, the destination node D sends a return packet to both relay nodes R2 and R3 (4060). The relay node R3 acknowledges the packet sent from the destination node D and sends the packet to the source node S (4070). Thus, the promiscuity of the wireless network allowed the node R3 to overhear a packet transmission and facilitate a more reliable and direct transmission of future packets from the destination node D to the source node S.

According to another embodiment of the invention, an opportunistic ad hoc routing protocol may be implemented at the Internet Protocol (IP) layer as opposed to the MAC layer as described above. Thus, the IP protocol of the ad hoc network 100 is adapted to allow for different nodes n to receive the same packet. Thus, the list of intended receivers for the next hop is included in an IP packet header. The intended receivers acknowledge in turn, so that the sender knows that at least one receiver has received the packet successfully. All receiving nodes n are also assumed to overhear the acknowledgement to decide whether or not to forward their copy of the packet. In addition, as will be described below, each node n is capable of updating itself in the event of a change in the ad hoc network. A change, for example, could be the addition or subtraction from the network 100 of a node n.

According to one embodiment of the invention, when the source node S wishes to establish a connection to a destination node D, node S sends a broadcast message or RREQ to node D. (Step 1000) The broadcast message is a flooded broadcast so that a packet is sent to every node n present in the ad-hoc network 100.

Each relay node n which receives the route request RREQ for the first time (Step 1010), carries out a set of tasks. First, according to one embodiment of the invention, a relay node n receiving the broadcast from the source node S increments the hop count stored in the IP packet header by one to create an updated packet (Step 1020). The hop count represents the number of legs traversed by a packet between the source node S and the destination node D. In addition, the relay node n creates a route entry in its route table (Step 1030). The route entry for a given relay node n is a list pair identifying the forwarding node $n_f$ (the node that forwarded the packet to the relay node n) and the IP packet header hop count ($n_f$, h). The relay node n then forwards the updated packet to other neighboring relay nodes n' by rebroadcasting the updated packet (Step 1040). Further, as shown in FIGS. 9(*b*) and 9(*d*), the destination node D processes the route request (RREQ) similarly to the relay nodes n described above (Steps 2000, 2010 and 2020), except that the destination node D does not forward the broadcast message (RREQ). Instead, the destination node D creates a route reply message RREP, and sends the RREP message to all the relay nodes n the destination node D has listed as potential forwarded entries in its route table (Step 2030). The route reply message RREP is addressed to D and includes two counters. The first RREP counter $h_d$, increases at every hop, and is used to assess the number of hops to route a packet from the relay node n which received the RREP back to the destination node D. The other RREP counter, $h_s$, stores the number of hops to the source node S.

When a node n receives a packet, the node compares its hop count to the destination D in its routing table with the current hop count. According to one embodiment of the invention, if the sum of (hop count to destination D in the routing table)+ (current-hop-count in the IP packet header) is less than (target hop count in the IP packet header)+a threshold value, then the packet is forwarded. If the threshold value is zero, then a packet is forwarded via the shortest path and/or multiple shortest paths.

According to another embodiment of the invention, a node n is configured to limit the number of packets sent. Before forwarding a packet, a node n waits a length of time proportional to (hop count to destination D)+(current hop count)−(target hop count). Accordingly, if a node n receives a packet from another node n whole node n is waiting the length of time given by the equation above, it indicates that the same packet has already been forwarded further down towards the destination. In response, node n cancels its own scheduled transmission.

A brief evaluation of the present invention is now described. Simulations were conducted in a 500×500 square area, in an attempt to connect two nodes situated at opposite corners of the square via N relay nodes uniformly distributed in the square. N was set to 75 and the performance of the present invention using the GE model described by Douglas.

Figure 11:
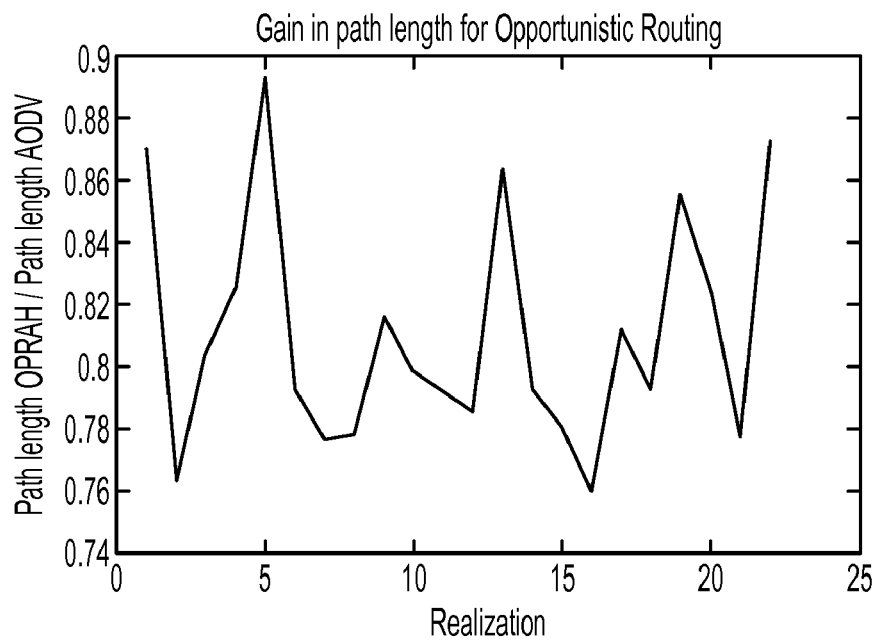
FIG. 11 is a graph showing the path length of a packet in an opportunistic protocol for in and ad hoc network divide by the packet length of a packet in a AODV protocol network using a Gilbert-Elliot model.

In the static case, the AODV protocol converges on a route that is stable throughout the simulation. However, this convergence is toward a route that is sub-optimal. FIG. 11 is a plot of the ratio of the path length for each packet for a protocol implemented by the present invention divided by the path length for AODV for different realization. As shown in FIG. 11, the protocol implemented by the present invention consistently finds a shorter path which is on average 77% of the length of the AODV path.

Figure 12:
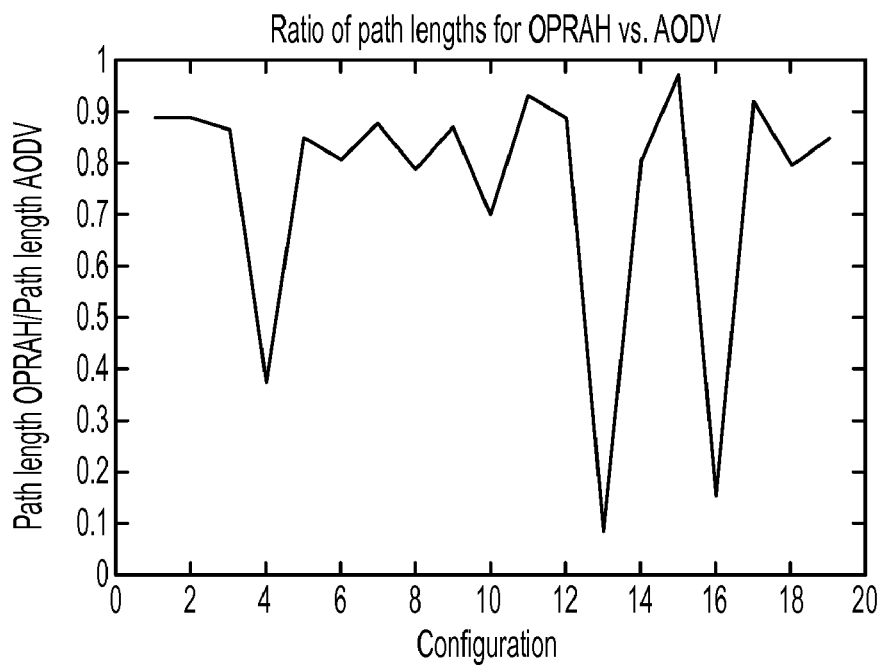
FIG. 12 is a graph showing the path length of a packet in an opportunistic protocol for in and ad hoc network divide by the packet length of a packet in a AODV protocol network using a correlated Rayleigh model.

FIG. 12 performs the same measurement as in FIG. 11 using the correlated Rayleigh fading channel model instead of the GE channel model. As shown, the path lengths for a protocol implemented using the present invention is on average three quarters the length of an AODV implemented path length.

To analyze the impact of the route repairs, a dynamic network in which nodes move about is considered. In this scenario, there is a fixed connectivity radius, and the variation in connectivity is only due to the movement of the nodes. N=50 and the connectivity radius is 250 m. Every node picks a speed and a direction. When a node hits the boundary, it picks another speed and direction so that it stays within the square. Speed and directions are picked uniformly. The speed is bounded below by a small minimal value so that no node stays stuck in a low speed forever.

Figure 13:
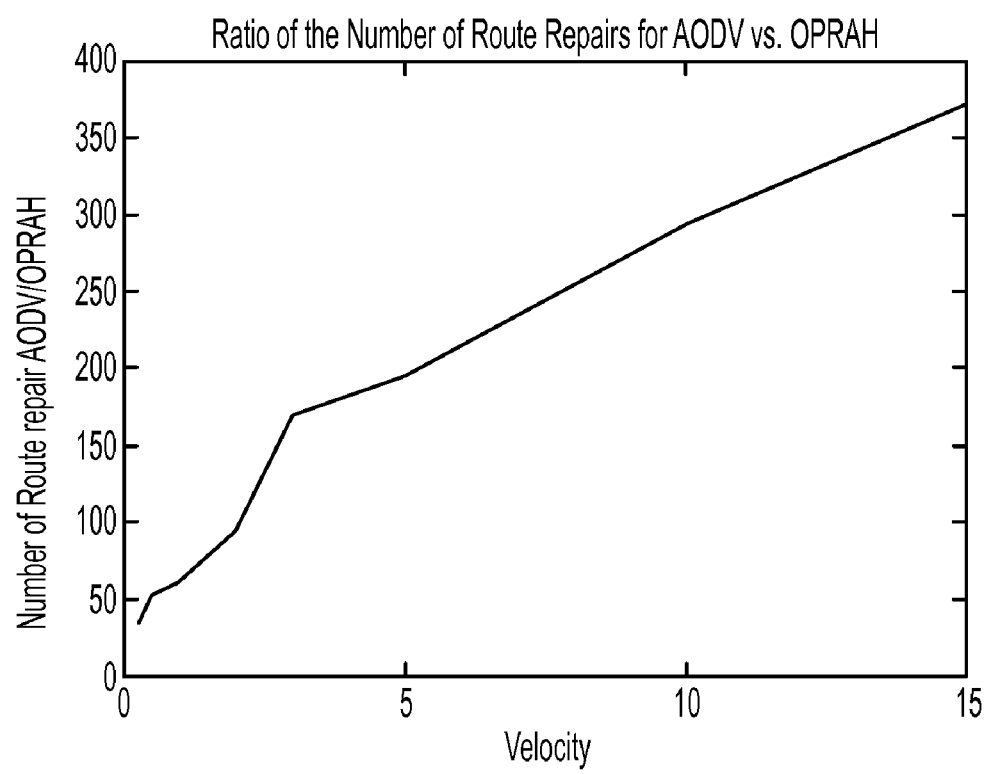
FIG. 13 is a graph showing the ratio of a mean number of route repairs, averaged over all simulation runs, for a 1000 time slot connections of an AODV protocol to a protocol implemented according to the present invention.

Route repair is sensitive to many parameters, such as the connectivity radius, the number of nodes, the length of the simulation, the mobility model, etc. FIG. 13 shows the ratio of a mean number of route repairs, averaged over all simulation runs, for a 1000 time slot connections of an AODV protocol to a protocol implemented according to the present invention. The number of route repairs is plotted as a function of the maximum speed of the mobile nodes. As shown, AODV requires significantly more route repairs than a protocol implemented according to the present invention.

The present invention as described in the embodiments above has several advantages over conventional systems. For example all nodes in the ad hoc network that can forward a packet to the destination node and are located "closer" than the source node competes to forward the packet. In addition, the present invention can be implemented using relatively simple off-the-shelf components. Further, the present invention has the ability to inter-operate with wired protocols, to ensure that the ad hoc network can communicate with the legacy wired infrastructure.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A method comprising:
   receiving a broadcast message from a source node at a relay node;
   receiving an additional copy of the broadcast message at the relay node from a forwarding node, wherein the additional copy of the broadcast message comprises a hop count that indicates a number of hops between the source node and the relay node via the forwarding node; and
   creating, for the forwarding node, an additional entry in a route table of the relay node in response to determining that the hop count is less than a threshold value.

2. The method of claim 1, wherein the additional entry is a list pair identifying the forwarding node and the hop count.

3. The method of claim 1, wherein the broadcast message is a flooded broadcast AODV route request.

4. The method of claim 1, further comprising, after receiving the broadcast message at the relay node:
   updating a received packet;
   creating a route entry in the route table; and
   rebroadcasting the updated packet to one or more neighboring relay nodes.

5. A method comprising:
   receiving a broadcast message from a source node at a relay node;
   receiving an additional copy of the broadcast message at the relay node from a forwarding node, wherein the additional copy of the broadcast message comprises a hop count that indicates a number of hops between the source node and the relay node via the forwarding node;
   receiving a route reply message from a destination node at the relay node, wherein the relay node updates a route table to identify potential forwarding nodes;
   sending an acknowledgment from the relay node to the destination node;
   forwarding the route reply message to the source node;
   comparing the hop count with one or more hop count values stored in the route table; and
   creating, for the forwarding node, an additional entry in the route table in response to determining that the hop count is less than a threshold value.

6. The method of claim 5, further comprising, after receiving the broadcast message from the source node at the relay node:
   creating an updated packet;
   creating a route entry in the route table of the relay node; and
   rebroadcasting the updated packet to one or more neighboring relay nodes.

7. The method of claim 5, wherein a MAC address of the relay node is included in a MAC header of the route reply message, and further comprising:
   incrementing a hop count to the destination node by one;
   inserting a value equal to the minimum number of hops to the source node in a header of a received packet; and
   adding an entry to the route table of the relay node identifying a potential forwarding node to the destination node.

8. The method of claim 5, wherein an IP address of the relay node is included in an IP packet header of the route reply message, and further comprising:
   incrementing a hop count to the destination node by one;
   inserting a value equal to the minimum number of hops to the source node in a header of a received packet; and
   adding an entry to the route table of the relay node identifying a potential forwarding node to the destination node.

9. The method of claim 5, wherein the relay node receives the route reply message via a local broadcast address, and further comprising:
   in response to determining that the relay node is a candidate for node forwarding, updating a received packet and the route table of the relay node; and
   sending an acknowledgment to the forwarding node.

10. A non-transitory computer readable medium storing computer-executable instructions that, when executed, cause a processor to at least perform:
    receive a broadcast message from a source node at a relay node;
    receive an additional copy of the broadcast message at the relay node from a forwarding node, wherein the additional copy of the broadcast message comprises a hop count that indicates a number of hops between the source node and the relay node via the forwarding node; and
    create, for the forwarding node, an additional entry in a route table of the relay node in response to determining that the hop count is less than a threshold value.

11. The non-transitory computer readable medium of claim 10, wherein the computer-executable instructions, when executed, cause the processor, after receiving the broadcast message from the source node at the relay node, to:
    create an updated packet;
    create a route entry in the route table of the relay node; and
    rebroadcast the updated packet to one or more neighboring relay nodes.

12. The non-transitory computer readable medium of claim 10, where the computer-executable instructions, when executed, cause the processor to:
    receive a route reply message from a destination node at the relay node;
    increment a hop count to the destination node by one;
    insert a value equal to the minimum number of hops to the source node in a header of a received packet; and
    add an entry to the route table of the relay node identifying a potential forwarding node to the destination node.

13. The non-transitory computer readable medium of claim 10, where the computer-executable instructions, when executed, cause the processor to:
    receive a route reply message from a destination node at the relay node;
    increment a hop count to the destination node by one in response to determining that an IP address of the relay node is included in an IP packet header of the route reply message;
    insert a value equal to the minimum number of hops to the source node in a header of a received packet; and
    add an entry to the route table of the relay node identifying a potential forwarding node to the destination node.

14. The non-transitory computer readable medium of claim 10, wherein the computer-executable instructions, when executed, cause the processor to:
    receive a route reply message from a destination node at the relay node via a local broadcast address; and
    in response to determining that the relay node is a candidate for node forwarding, update a received packet and the route table of the relay node; and
    send an acknowledgment to the forwarding node.

15. An apparatus comprising:
a processor; and
a memory unit storing computer-executable instructions that, when executed by the processor, cause the apparatus to:
  receive a broadcast message from a source node;
  receive an additional copy of the broadcast message from a forwarding node, wherein the additional copy of the broadcast message comprises a hop count that indicates a number of hops from the source node to the apparatus via the forwarding node; and
  create, for the forwarding node, an additional entry in a route table in response to determining that the hop count is less than a threshold value.

16. The apparatus of claim 15, wherein the computer-executable instructions, when executed, cause the apparatus, after receiving the broadcast message from the source node, to:
  create an updated packet;
  create a route entry in the route table; and
  rebroadcast the updated packet to one or more neighboring relay nodes.

17. The apparatus of claim 15, wherein a MAC address of the apparatus is included in a MAC header of a route reply message, and the computer-executable instructions, when executed, cause the apparatus, after receiving the route reply message, to:
  increment a hop count to a destination node by one;
  insert a value equal to the minimum number of hops to the source node in a header of a received packet; and
  add an entry to the route table identifying a potential forwarding node to the destination node.

18. The apparatus of claim 15, wherein an IP address of the apparatus is included in an IP packet header of a route reply message, and the computer-executable instructions, when executed, cause the apparatus, after receiving the route reply message, to:
  increment a hop count to a destination node by one;
  insert a value equal to the minimum number of hops to the source node in a header of a received packet; and
  add an entry to the route table identifying a potential forwarding node to the destination node.

19. The apparatus of claim 15, wherein the apparatus receives a route reply message via a local broadcast address, and the computer-executable instructions, when executed, cause the apparatus, after receiving the route reply message, to:
  in response to determining that the apparatus is a candidate for node forwarding, update a received packet and the route table; and
  send an acknowledgment to the forwarding node.

* * * * *